US012600572B2

(12) United States Patent
Petrov et al.

(10) Patent No.: US 12,600,572 B2
(45) Date of Patent: Apr. 14, 2026

(54) MOTOR-DRIVEN CONVEYOR-ROLLER CONTROLLER, SYSTEM COMPRISING SUCH A CONTROLLER AND METHOD FOR OPERATING A MOTOR ROLLER

(71) Applicants: Dimitar Ivanov Petrov, Sofia (BG); Nikola Aleksandrov Yankov, Sofia (BG); Dimitar Hristov Suvandzhiev, Sofia (BG); Ivan Dimitrov Petrov, Sofia (BG); Kazuya Ichieda, Miki city (JP); Randy Combs, Burlington, KY (US); Georg Malina, Düsseldorf (DE)

(72) Inventors: Dimitar Ivanov Petrov, Sofia (BG); Nikola Aleksandrov Yankov, Sofia (BG); Dimitar Hristov Suvandzhiev, Sofia (BG); Ivan Dimitrov Petrov, Sofia (BG); Kazuya Ichieda, Miki city (JP); Randy Combs, Burlington, KY (US); Georg Malina, Düsseldorf (DE)

(73) Assignees: Kyowa Europe GmbH, Leichlingen (DE); Industrial Software, Sofia (BG)

( * ) Notice: Subject to any disclaimer, the term of this patent is extended or adjusted under 35 U.S.C. 154(b) by 248 days.

(21) Appl. No.: 18/449,418

(22) Filed: Aug. 14, 2023

(65) Prior Publication Data

US 2023/0391556 A1 Dec. 7, 2023

Related U.S. Application Data

(63) Continuation of application No. PCT/EP2022/051550, filed on Jan. 25, 2022.

(30) Foreign Application Priority Data

Feb. 24, 2021 (EP) .................................... 21158908

(51) Int. Cl.
B65G 43/00 (2006.01)
B65G 13/06 (2006.01)

(52) U.S. Cl.
CPC ............. B65G 43/00 (2013.01); B65G 13/06 (2013.01); *B65G 2203/0291* (2013.01); *B65G 2811/095* (2013.01)

(58) Field of Classification Search
CPC ................... B65G 43/00; B65G 13/06; B65G 2203/0291; B65G 2811/095; B65G 13/07; H04W 4/80; H04W 4/35
See application file for complete search history.

(56) References Cited

U.S. PATENT DOCUMENTS

| | | | | | |
|---|---|---|---|---|---|
| 5,862,907 | A | * | 1/1999 | Taylor ................. | B65G 47/261 198/781.05 |
| 6,047,812 | A | * | 4/2000 | Horn .................... | B65G 47/261 198/460.3 |

(Continued)

FOREIGN PATENT DOCUMENTS

| | | | |
|---|---|---|---|
| JP | 2004140772 A | 5/2004 |
| JP | 2009233923 A | 10/2009 |

(Continued)

*Primary Examiner* — Mark A Deuble
(74) *Attorney, Agent, or Firm* — Reinhart Boerner Van Deuren P.C.

(57) ABSTRACT

A motor-driven conveyor-roller controller for conveyor installations for conveying containers. The controller incudes a power inlet, a wired I/O port, and a wired motor roller port. The controller is configured to output motor roller control signals for a motor roller at the motor roller port. The controller is configured to receive motor roller status signals from the motor roller at the motor roller port and to receive motor roller control signals for the motor roller at the I/O port. The wired I/O port is configured to exchange control information with a central control center. The controller includes a wireless configuration port that is configured to (Continued)

wirelessly receive, from a mobile device, at least configuration signals for the motor roller and/or send status signals representing motor roller status information.

20 Claims, 6 Drawing Sheets

(56)                References Cited

U.S. PATENT DOCUMENTS

| | | | | |
|---|---|---|---|---|
| 6,701,214 | B1 * | 3/2004 | Wielebski | B65G 47/261 |
| | | | | 700/229 |
| 6,843,362 | B2 * | 1/2005 | Tachibana | B65G 47/261 |
| | | | | 198/781.05 |
| 7,062,355 | B2 * | 6/2006 | Wielebski | B65G 43/10 |
| | | | | 198/781.06 |
| 7,104,395 | B2 * | 9/2006 | Brown | B65G 13/06 |
| | | | | 198/781.01 |
| 7,280,889 | B2 * | 10/2007 | Knepple | B65G 47/30 |
| | | | | 198/460.1 |
| 8,983,651 | B2 * | 3/2015 | Combs | G05B 19/4189 |
| | | | | 700/230 |
| 12,116,209 | B2 * | 10/2024 | Kolay | B65G 47/54 |
| 12,116,212 | B2 * | 10/2024 | Petrov | B65G 43/00 |
| 2012/0024669 | A1 * | 2/2012 | Danelski | B65G 13/02 |
| | | | | 198/781.05 |
| 2012/0048682 | A1 * | 3/2012 | Itoh | B65G 13/02 |
| | | | | 198/780 |
| 2019/0193946 | A1 | 6/2019 | DeVries et al. | |
| 2020/0277145 | A1 | 9/2020 | Combs et al. | |
| 2023/0382651 | A1 * | 11/2023 | Greyson | B65G 13/06 |

FOREIGN PATENT DOCUMENTS

| | | |
|---|---|---|
| JP | 2016507809 A | 3/2016 |
| JP | 2017171506 A | 9/2017 |
| JP | 2019519012 A | 7/2019 |

* cited by examiner

MOTOR-DRIVEN CONVEYOR-ROLLER CONTROLLER, SYSTEM COMPRISING SUCH A CONTROLLER AND METHOD FOR OPERATING A MOTOR ROLLER

CROSS-REFERENCE TO RELATED PATENT APPLICATIONS

This patent application is a continuation of International Application No. PCT/EP2022/051550, filed on Jan. 25, 2022, which claims the benefit of priority to European Patent Application No. 21158908.0, filed Feb. 24, 2021, the entire teachings and disclosures of both applications are incorporated herein by reference thereto.

FIELD OF THE DISCLOSURE

The subject matter relates to a motor-driven conveyor-roller controller as well as a system comprising such a controller and a method for operating a motor-driven conveyor-roller (motor roller).

BACKGROUND

Motor-driven conveyor-rollers, a.k.a. motor rollers, comprise a roller body rotatable mounted about a roller axis. The roller body usually is a hollow tube. Within the roller body the motor is arranged. The motor is an electric motor which is configured to generate a rotational movement about the roller axis between an axle element and the roller body.

For the sake of understanding, in the following the term motor roller can be used for the motor within the roller body alone, a drive unit comprising the motor and a corresponding control circuit for the motor within the roller body or the roller body comprising the motor or the drive unit. In the following the term motor can be used for the motor as such as well as the drive unit comprising the motor as such and a corresponding control circuit for the motor.

It is well known that motor-rollers are operated by a control unit, also known as controller, being arranged external, outside the roller body. The controller exchanges control signals with the motor inside the roller body.

Motor-driven conveyors driven by motor-rollers of this type are used in conveyor systems. In such conveyor systems, a single motor rollers is used to operate several roller bodies within a conveyor zone. Conveyor systems oftentimes have several conveyor zones through which an object to be conveyed passes one after the other. As has been said, within each conveyor zone, at least one motor-driven conveyor-roller operates several rollers.

For operating conveyor systems, two different concepts are known. One concept is a decentralized control of the motor-rollers. Therein, each motor-roller is controlled by one dedicated controller, respectively. Such a decentralized control having a 1:1 relationship between a motor-driven conveyor-roller and a controller is available as EZ-CUBE sold by the applicant.

Such a controller has a wired power inlet for receiving electric power, preferably dc-power. Moreover, the controller has a wired motor roller port. The wired motor roller port is configured to provide the motor roller with drive power. The motor can be fed through the motor roller port using a PWM-signal to control at least the rotational speed of the motor. In addition, status information and control signals can be exchanged between the motor roller and the controller using the motor roller port. Status information and/or control signals can, inter alia, include current motor speed, set motor speed, current conveyor speed, set conveyor speed, current rotational direction, set rotational direction, current/set operation mode, temperature, error messages, gear ratio of the motor gear, serial number, article number, production date etc. In particular, the motor roller port is a four wired motor port in line with EP 3 100 340 B1.

The controller further comprises a wired I/O (Input/Output)-port. This I/O-port is configured to exchange control information with a central control center for instance a central SPS-control. The I/O-port can, for instance, be configured using a proprietary protocol. However, the I/O-port can also be configured using standardized I/O-protocols, for instance according to CAN, DeviceNet, Ethernet Powerlink, INTERBUS, Fieldbus, LIN, M-Bus, PROFI-BUS, VARAN etc.

As such, the controller is configured to exchange motor roller control signals with a motor roller at the motor roller port, to exchange motor roller status signals with the motor roller at the motor roller port and to exchange motor roller control signals for the motor roller with a central control at the I/O-port. Exchange of the relevant control and status signals are well known and need no further description. It should be noted that all of the ports an inlets described above are preferably wired ports, requiring wiring between the motor roller and the controller and be the controller and centralized control center. Wiring usually is necessary to provide stable communication in industrial environments.

Since conveyor systems have several conveyor zones, the controllers of the respective zones are each operated by one single control center. Obtaining status information of one single controller is oftentimes cumbersome when using the centralized control center. In particular, configuring the centralized control center for providing individual status information of individual controllers along a conveyor system with several conveyor zones oftentimes is labor intensive. In particular for technicians working on site directly at the conveyor system, it is oftentimes impossible to quickly obtain motor roller information i.e. directly when they are working at the respective controller. Thus, there is a need to enable technician to easily and quickly install, configure and/or reconfigure controllers on site without detouring via the centralized control center.

For instance the EZ-CUBE controller of the applicant provides for so called dip-switches, which allow configuring the controller onside manually. However, to monitor and parameterize the settings of the controller and thus the motor roller, it is necessary to know on site the actual status of the motor roller. Since this status information currently is only available at the centralized control center, the technician on site might be incapable of correctly setting the controller and thus the motor roller for the individual control zones.

SUMMARY OF THE INVENTION

The subject matter is thus based on the object of enabling on site setting of a conveyor-roller controller.

This object is solved by a controller according to claim 1, a system according to claim 9 as well as a method according to claim 13.

For flawless operation of conveyor systems, in particular with several conveyor zones and several motor-driven conveyor-rollers being controlled by several controllers, wired installation appears to be necessary in industrial applications. Thus, for usual operation of the motor-driven conveyor-roller controllers, they need to be wired with a central controller. Nevertheless it has been found that for on site maintenance, installation, configuration, re-configuration and/or troubleshooting and the like of decentralized controllers, wirelessly obtaining controller information and setting controller parameters is highly useful. Thus, the controller according to the subject matter provides for a wireless configuration port.

A wireless configuration port within the controller enables wireless communication between a mobile device, e.g. a mobile phone, a mobile computer, a mobile tablet computer, smart glasses or the like, and the controller. This communication may be, according to embodiments, unidirectional or bidirectional. With unidirectional communication it may be possible to only receive motor roller status information within the mobile device. With bidirectional communication, not only status information is available in a mobile device, but in addition configuration signals for configuring the controller and the respective motor roller can be send to the controller. Thus, the controller and its parameters can be set wirelessly on site using a mobile device. This enables a technician to easily and quickly set and/or change control parameters and thus to change motor settings.

Control parameters may, for instance, be current/set motor speed, current/set motor acceleration, current/set motor deceleration, current/set direction of rotation (clockwise/counterclockwise), motor type, ON/OFF switch for the P, PI or PID regulator, brake mode, run/stop the motor, type of inputs (NPN or PNP), manual/auto clear error, analog/digital control, set speed, NPN/PNP error, ON/OFF switch for the error output, NPN/PNP speed setting etc.

These settings can be manually set using the mobile device, for instance, using an HMI of the mobile device. The set parameters can be exchanged with the controller using the wireless configuration port.

It may be possible that the dip switches on the controller can be dispensed off. This further makes the controller robust against environmental influences, since the casing of the controller needs no opening for accessing the dip switches.

Not only motor parameters can be exchanged between the mobile device and the controller using the wireless configuration port, but also status information. For this reason wireless exchange of status signals representing motor roller status information is possible via the wireless configuration port.

For the sake of clarity, the term "exchange" may comprise transfer, sending, receiving data using the air interface between the mobile device and the controller. Appropriate communication protocols for exchange of data on the air interface are well known in the art and need no further explanation.

Status information may include different diagnostic messages. Status information may for instance be current/set amperage, motor temperature, current/set motor voltage, motor overvoltage counter, motor undervoltage counter, high current counter, for system errors, e.g. error writing to flash, error reading values from flash, error setting BLE advertisement data, error enabling advertisement, error initializing flash etc, for motor errors, e.g. performance limit, CPU overheat, short circuit, motor stalled, motor overloaded, heat stop and the like.

Exchange of data may for instance include exchange of data containers having a header and a payload. Within the header, information about which data is provided in the payload may be coded and in the payload the value of the parameter may be coded.

The mobile device can be configured for receiving manual inputs for controller parameters via its HMI. This may be provided using a screen or display, where a user may manually enter, input, alter, manipulate certain parameters of parameters for controlling the motor roller. The same screen or display may also be used for outputting status information depending on the exchanged status signals with the wireless configuration port.

According to an embodiment, it is proposed that the controller further comprises a memory. This memory may be configured to log data. Data to be logged may include the above defined status information. As has been described above, different status information about the motor roller and/or the controller may be available on an ongoing basis. Time series of such a data may be logged within the memory. The data may be logged together with a timestamp. Logging data may be beneficial in order to track behavior of the motor roller, in particular for preemptive maintenance as well as tracking errors in the functioning of the conveyor system as well as for troubleshooting. The logged data may be wirelessly exchanged using the wireless configuration port. The logged data may, for instance be send to the mobile device.

According to an embodiment, the wireless configuration port has a unique communication identification. The wireless communication port may a, for instance, be a circuit board, having an antenna and a communication processor. The communication processor may be uniquely identified. For instance, such an identification can be a MAC-address. However, any other suitable unique communication identification can be used. It should be noted that the unique communication identification needs only to be unique throughout the conveyor system in order to unambiguously identify the configuration port and thus the respective controller. The configuration port and the controller can be addressed inter alia, using at least the communication identification.

In order to easily allow pairing the mobile device and the controller, it is necessary that the device to be pared with the controller is aware of the unique communication identification. Pairing may be understood as establishing a communication channel between the mobile device and the controller. Pairing may be understood as connection the mobile device with the controller.

Since the unique communication identification can be a simple numeric or alphanumeric code, it may be possible to just print this code onto the casing of the controller. However, to more easily enable users using such a code with their mobile devices, it is proposed, according to an embodiment that on a casing of the controller a code representing the unique communication identification is printed, in particular that the code is a bar code or a 2D code. Such a 2D code may, for instance be QR-code. The QR-code may be coded according to ISO/IEC18004:2000 or ISO/IEC18004:2006 or any subsequent standard. By scanning such a code, the mobile device may automatically obtain the unique communication identification of the configuration port and thus the controller and initiate a communication link with this controller.

The unique communication identification may also be provided by the controller using near field communication (NFC). This may be using passive or active NFC.

The controller may scan its environment in intervals for polling signals and may initiate a handshake procedure once it senses a polling signal containing its unique communication identification. Also, the controller may send polling signals containing its unique communication identification and mobile devices in its environment may initiate a handshake procedure once they sense a polling signal containing the unique communication identification just obtained. This ensures that mobile devices are paired with the correct controller, i.e. the controller the devices have obtained the unique communication identification of.

According to an embodiment, it is proposed that the wireless configuration port is configured to be paired with a mobile device using the unique communication identification. This pairing may be carried out using a handshake mechanism. Pairing with a controller, in particular its respective wireless configuration port, enables the mobile device to communicate with the controller. This enables exchange of status signals and control signals between the mobile device and the controller. Moreover, logged data may be exchanged. Thus, on site, using a mobile device, a technician may easily configure a controller. Moreover, a controller status, in particular a current controller status and, using the logged data, a historic controller status may be obtained from the controller directly on site, without detouring via the central computer. This makes maintenance far more efficient, since directly onside all the data is available and all parameters can be adjusted according to current needs.

The communication technology underling the wireless communication between the wireless communication port and the mobile device is based on a radio frequency communication protocol. Therefore, it is proposed that the wireless communication port is a radio communication port. This radio communication port may be based on different underlying protocols such as cellular communication, such as 3G, 4G, 5G or the like. Moreover, communication may be accordingly to the WLAN standard, in particular according to IEEE802.11 or Bluetooth communication or nearfield communication (NFC) or the like. Also, wireless communication may be optical communication, in particular using infrared. All these wireless technologies enabling wireless communication between the mobile device and the controller.

As been said above, the conveyor system may have various conveyor zones. Each of the conveyor zones may have one motor-roller and several passive rollers, being driven by the motor-roller. Each motor-roller may be assigned to a dedicated controller connected to the motor-roller via the wired motor roller port. It is preferred that one controller is configured for connection with one single motor-roller only. Thus, a wired motor roller port is configured to have a 1:1 relation between the motor-roller and controller. Thus, each controller has a dedicated motor-roller making inspection and parameterization easier.

Another aspect is a system according to claim 9. Therein a mobile device is configured to be paired with the controller. The mobile device is further configured to wirelessly send at least configuration signals for the motor roller to the wireless configuration port and/or receive status signals for representing motor roller status information from the wireless configuration port. The mobile device may be configured using a mobile application, also called app. This application instructs the mobile device to pair with the controller in particular using the unique communication information.

Besides control information and status information log data may also be received according to embodiments in the mobile device. Within the mobile device these historic data may be displayed enabling technicians to carry out maintenance based on knowledge on historic motor status information.

Another aspect is a method according to claim 13.

BRIEF DESCRIPTION OF THE FIGURES

These and other aspects will be described with reference to the following figures. In the figures show.

DETAILED DESCRIPTION

Figure 1:
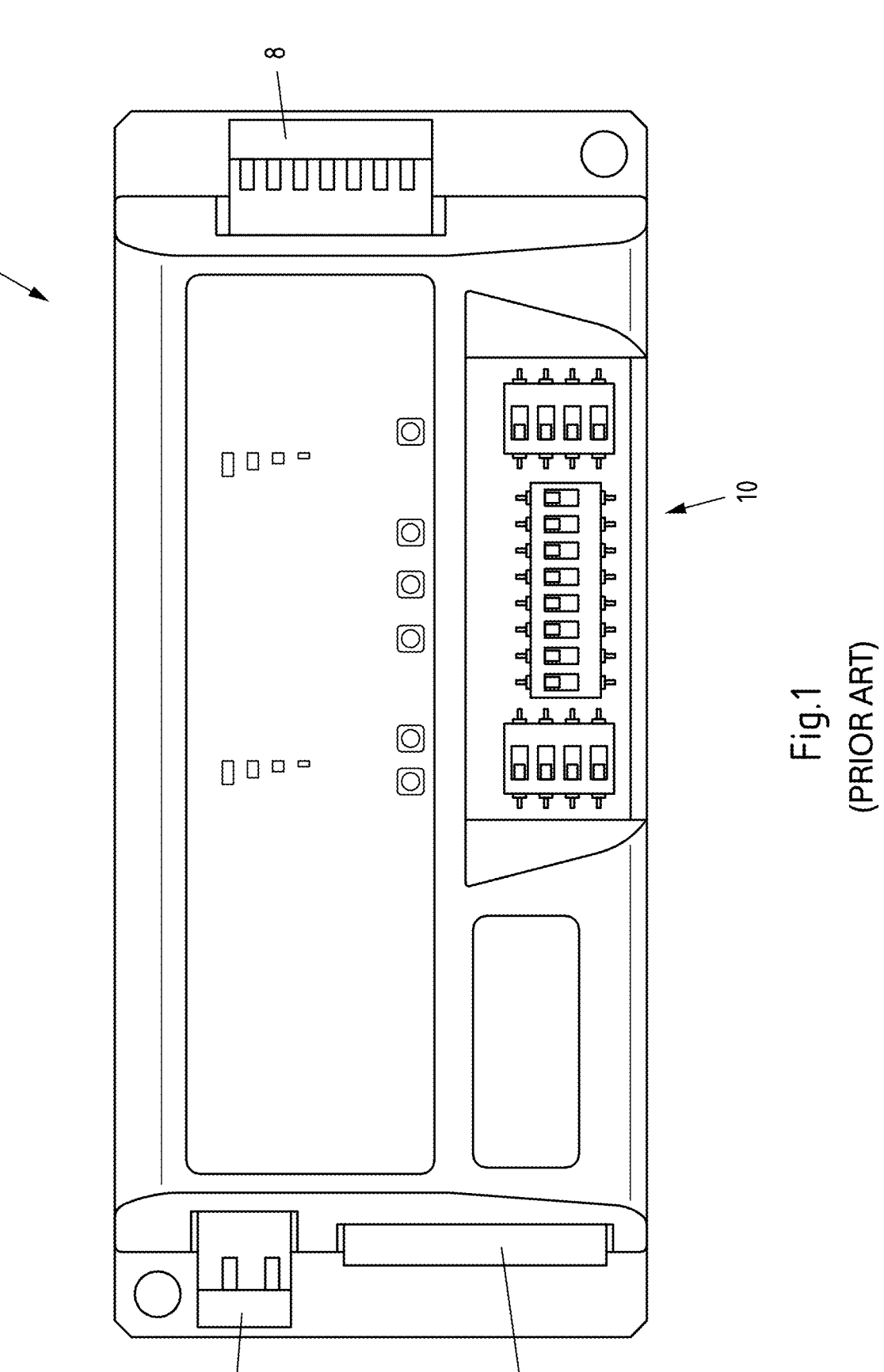
FIG. 1 is a conventional controller for motor rollers.

FIG. 1 shows a conventional controller 2 for motor rollers. The controller 2 has a power inlet 4. The power inlet 4 preferably is a DC-power inlet 4, in particular 12V or 24V power inlet. Power inlet 4 receives the electric power for operating the controller 2. The Power inlet 4 may also receive the electric power for operation a motor roller.

A motor roller can be connected to a motor roller port 6. Motor roller port 6 has at least two, preferably four connectors for connecting the motor roller. Via the motor roller port 6 the motor-roller may at least be supplied with electrical energy. In addition, the motor-roller may be controlled by exchanging control signals and/or status information signals via the motor roller port 6. Control of motor rollers as such is well known and will not be described in more detail.

Eventually, controller 2 has an I/O-port 8. I/O-port 8 can be a communication port for wired communication, for instance according to an industry standard, in particular as mentioned above. Moreover, I/O-port 8 can support any proprietary protocol. Via port 8 control signals and/or status information can be exchanged between the controller 2 and a central control center.

For interpreting the control signals received on I/O-port 8, for transposing these signals into corresponding motor settings and for configuring the motor roller according to current needs, the controller 2 has a control panel 10 which comprises dip switches for manually setting parameters of controller 2. The setting of parameters of a controller for motor rollers as such is well known and will not be described in more detail.

Figure 2:
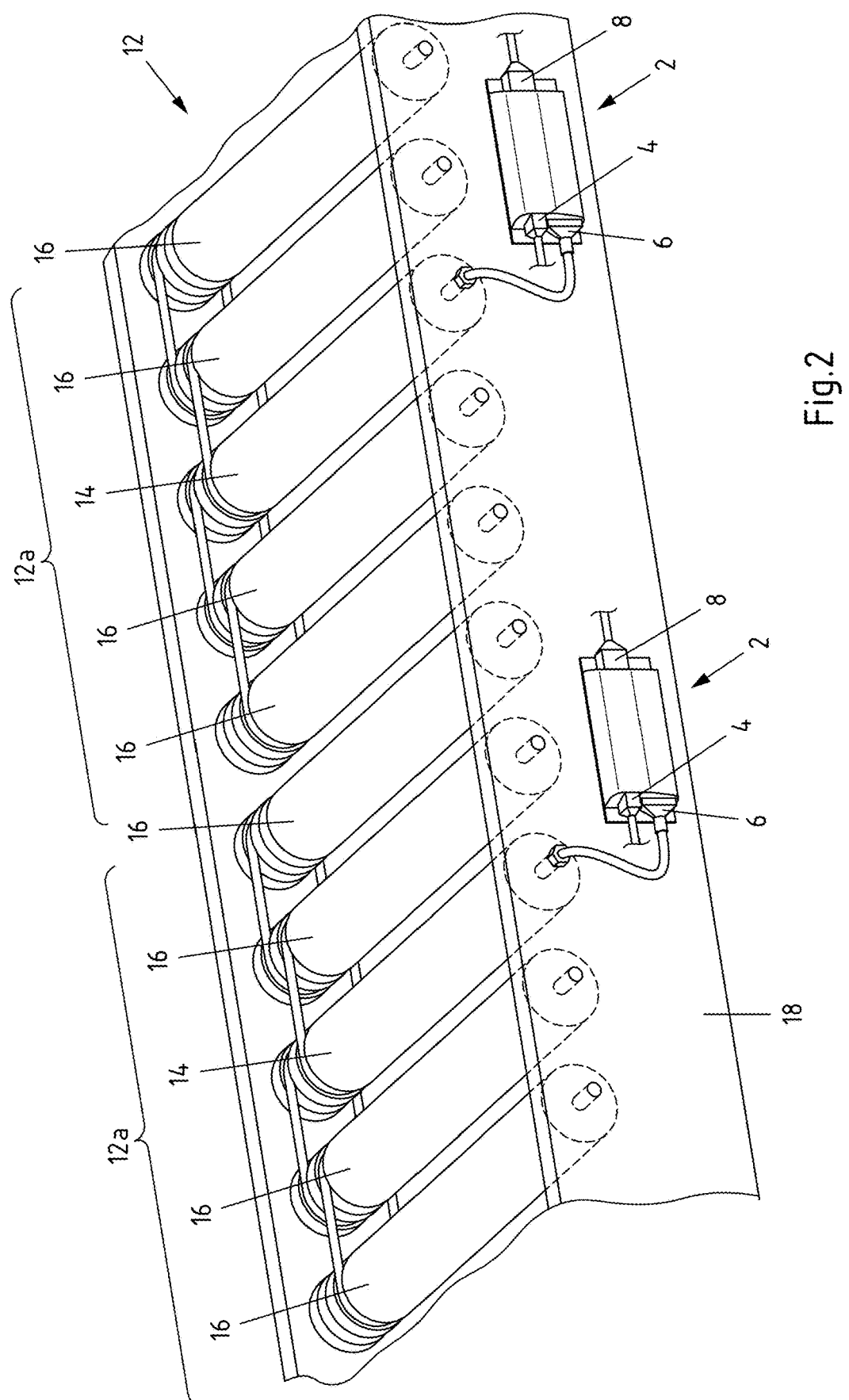
FIG. 2 is a conveyor system with two motor rollers and two controllers.

A conveyor system 12 as illustrated in FIG. 2 may comprise motor rollers 14 and rollers 16. A conveyor system 12 may have two or more conveyor zones 12a. Within each conveyor zone 12a, one motor roller 14 is mechanically coupled with at least one, preferably between two to seven rollers 16, in particular by V-belts or poly-V-belts or the like. Other mechanical couplings are also possible.

A motor roller 14 is rotatable arranged on a rack 18 and comprises a motor within a hollow tube. The motor within the hollow tube is connected to the controller 2 via its motor roller port 6.

For each of these zones 12a, a separate controller 2 is provided controlling the respective motor-roller. The controllers 2 are connected to power and a control bus via their power inlets 4 and I/O-ports 8.

Figure 3:
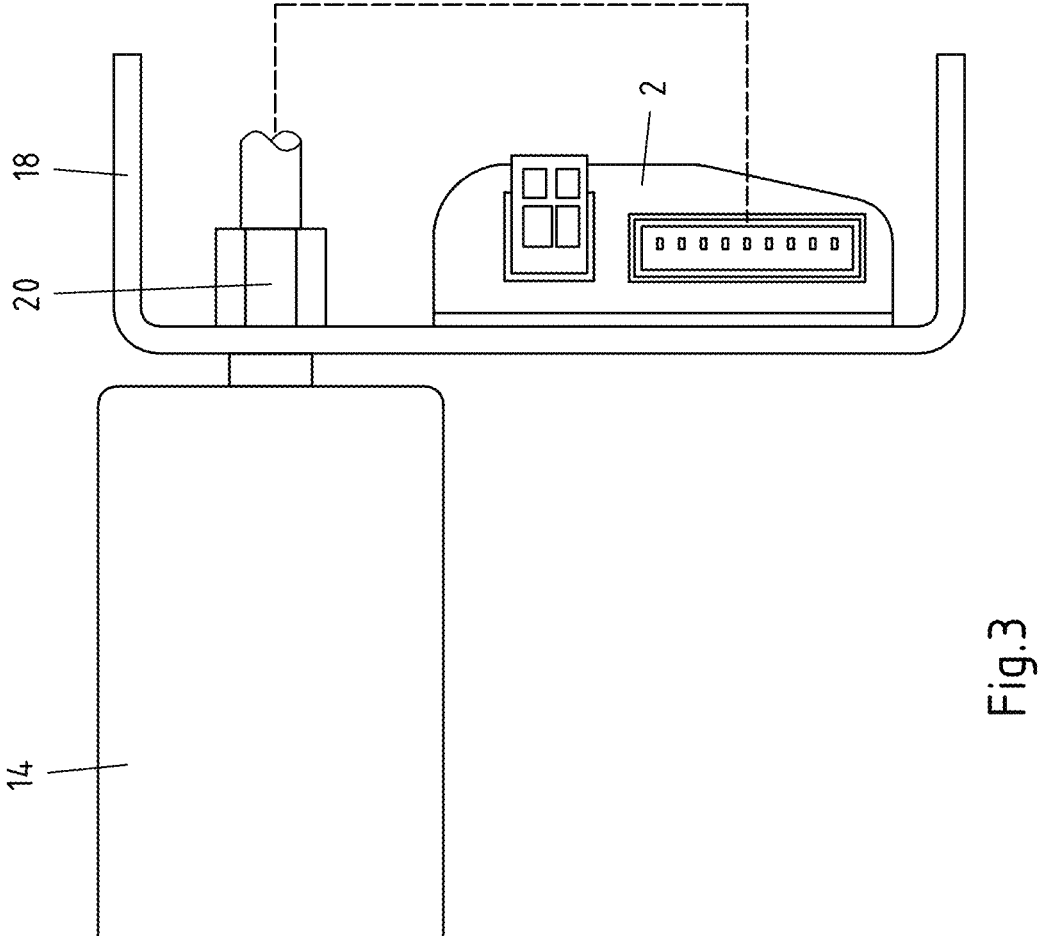
FIG. 3 is a schematic representation of arranging a controller at a motor roller.

The controllers 2 are arranged on the rack 18 as illustrated in FIG. 3. Therein, it can be seen that the motor roller 14 is rotatable arranged using an axel 20 fixed to the rack 18.

Figure 4:
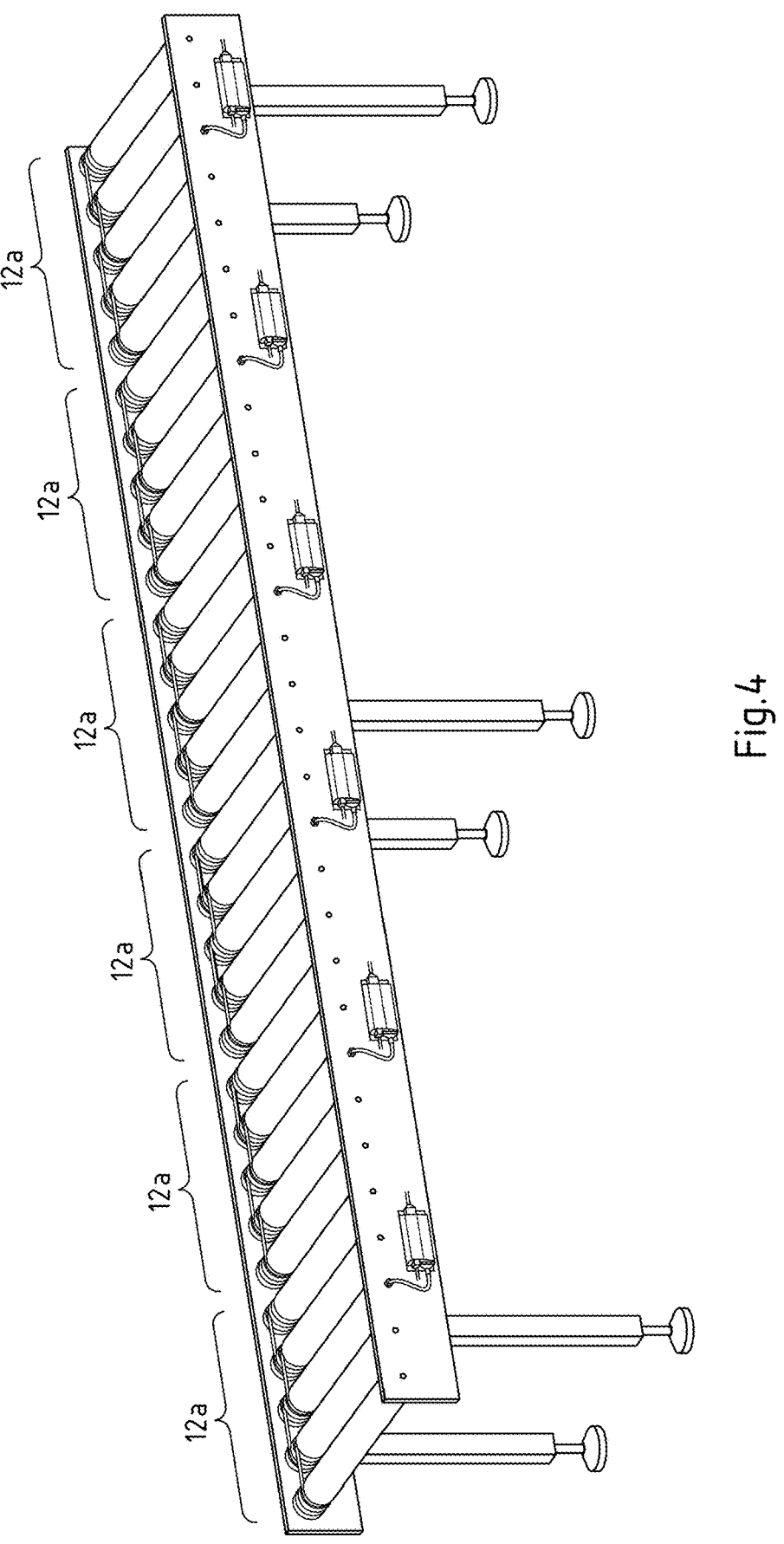
FIG. 4 is a conveyor system with several conveyor zones.

A conveyor system 12 with a plurality of conveyor zones 12a is illustrated in FIG. 4. For each conveyor zone 12a a single controller 2 is provided controlling a single motor roller 14. As can be seen, a conveyor system 12 can have a plurality of conveyor zones 12a and thus a plurality of controllers 2. A technician maintaining or installing the conveyor system 12 needs to parameterize each controller 2 separately to enable flawless flow of packages along the conveyor.

This requires appropriate setting of the parameters mentioned above, for instance the rotational speed of the respective motor rollers 14 in order to have all rollers roll with the required speed. Moreover, the rollers of different conveyor zones 12a need to be synchronized. Due to manufacturing biases, it is necessary to manually parameterize each motor roller separately. Such a setting of parameters of motor rollers however, also requires knowledge of a current status of a motor roller and most likely also historic data. When the technician is working at the conveyor system 12, it would be cumbersome to read out all data from a central computer and also to align the read out data with the controller the technician is actually working at.

Figure 5:
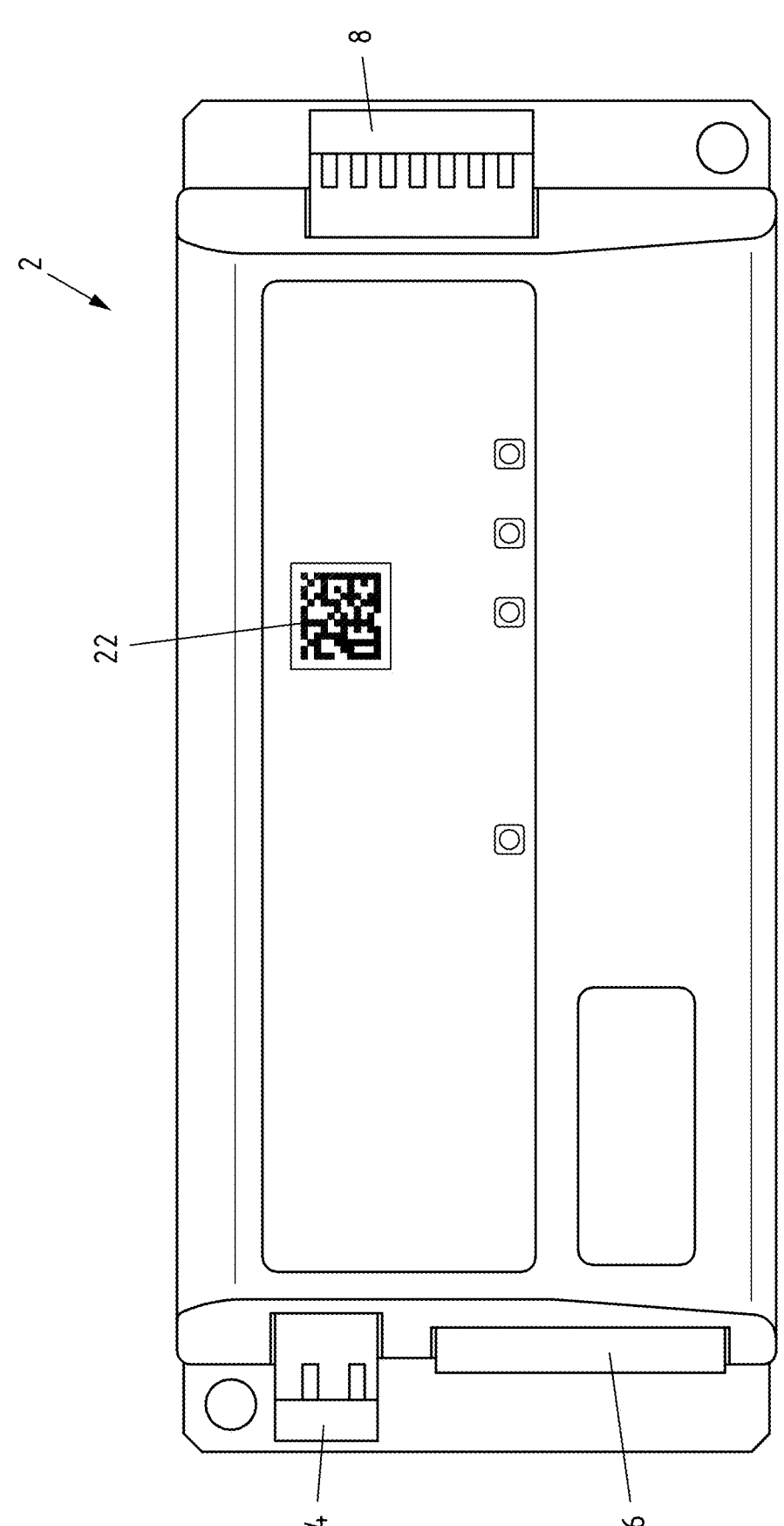
FIG. 5 is a controller with a printed unique communication identification.

For this reason, the subject matter provides for a controller 2, according to embodiments, as depicted in FIG. 5.

As can be seen, the controller 2 also has a power inlet 4, a motor roller port 6 and an I/O-port 8 as described above. The controller 2 may be operated exactly the same way as previously described. In addition, however, the controller 2 according to embodiments is enabled for wireless communication with a mobile device as will be described below.

In order for the controller 2 to be wirelessly paired with a mobile device, the controller 2 may have a unique communication identification. This unique communication identification may, according to embodiments, be coded in a 2D code 22, imprinted onto the casing of controller 2. Any type of code, a 2D-code, a barcode, a QR-code or the like may be used. Also the unique communication identification may be imprinted on the casing in numeric or alphanumeric characters and scanned and OCRed by the mobile device.

Figure 6:
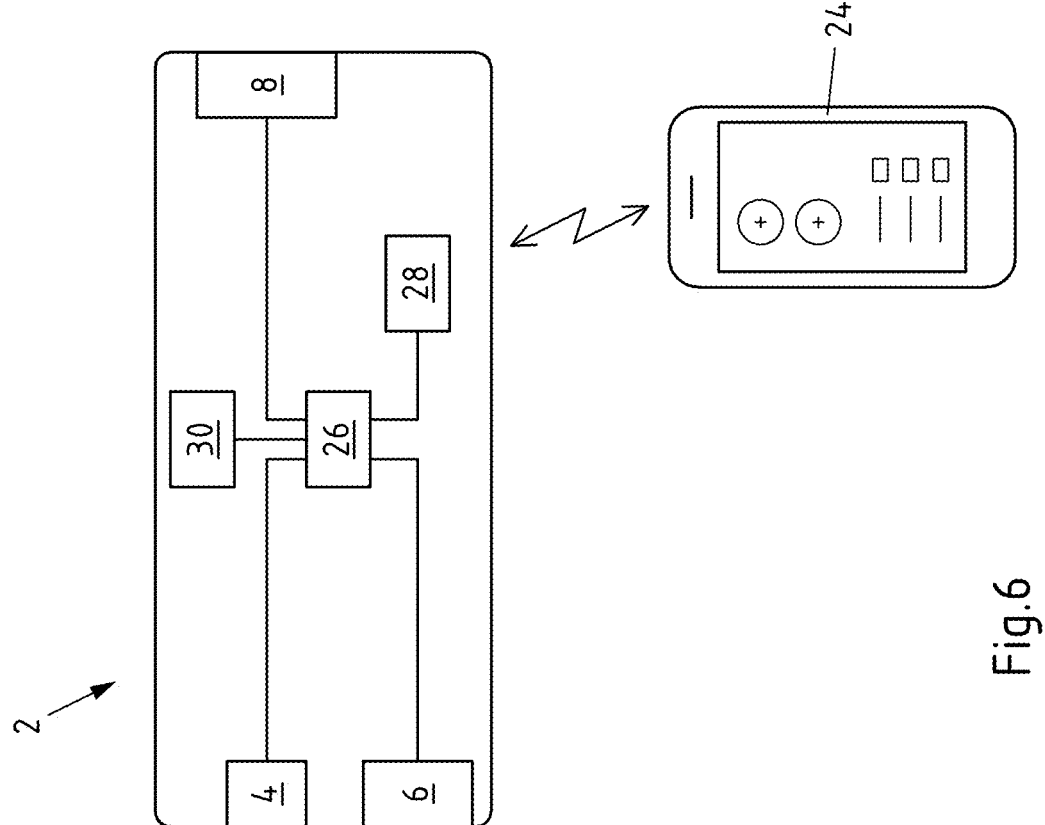
FIG. 6 is a schematic view of a controller with a mobile device.

Using a mobile device, as illustrated in FIG. 6, the technician is able to connect to the controller 2, he is actually working at.

The controller 2 is schematically illustrated in FIG. 6. Therein it can be seen that a central processor 26 is connected to the power inlet 4, the motor roller port 6 and the I/O-port 8. The central processor 26 can be programmed. The programming may be understood a setting parameters for the motor roller. According to the programming the motor roller is instructed via motor roller port 6 to at least rotate in a certain direction at a certain speed. Any other parameters as described above can be parameterized and programmed.

In order for wireless configuration of these parameters, the controller 2 also has a wireless communication port 28 in order to be paired with the mobile device 24. Once the communication port 28 and the mobile device 24 are connected with each other, i.e. a communication channel is established, it is possible to wirelessly set the parameters of controller 2 and read out status information from controller 2. In addition, controller 2 may have a memory 30.

During operation, central processor 26 outputs control signals for a motor roller 14 via motor roller port 6. The signals output, the amperage as well as the voltage of the output signals and the like depend on configuration settings (parameters) of controller 2. Moreover, during operation, central processor 26 reads out status information from the motor roller via motor roller port 6.

When a technician is installing, maintaining and/or troubleshooting the conveyor system 12, each controller 2 needs to be parameterized individually and separately. When installing, maintaining and/or troubleshooting, the technician is working on site spatially directly at the controller 2.

The technician may use his mobile device 24 with an appropriate installed application to pair with the controller 2. For this reason the unique communication identification 22 is preferably wirelessly, i.e. optically or via radio, read out by mobile device 24. Using the unique communication identification 22, the technician can pair his mobile device 24 exactly with the controller 2 he intends to. Since several controllers 2 are arranged side by side along a conveyor system in neighboring conveyor zones 12a, the use of the unique identification code 22 ensures that the mobile device 24 connects with the correct controller 2 and not with a neighboring one. This is in particular safeguarded if the unique communication identification 22 is read out optically.

Once connected via the wireless configuration port 28, control parameters may be exchanged between the mobile device 24 to the controller 2. Also, via the established communication link, status signals representing motor roller status information may be exchanged between the configuration port 28 to the mobile device 24. Eventually during operation, the controller 2 may log data about motor roller status in memory 30. Also the stored log data from memory 30 may be send to mobile device 24 via the established communication channel.

By using the unique communication identification code 22 a mobile device 24 can be connected to a controller 2 with high confidence. It is prevented that a mobile device 24—by accident—connects with a controller 2 not being intended for being connected to. The setting of the controller 2 and its parameters for operating the motor roller is possible via the mobile device 24. Eventually, status information about the motor roller can be read out using the mobile device 24.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE LIST 2 controller
4 power inlet
6 motor roller port
8 I/O-port
10 control panel
12 conveyor system
12a conveyor zone
14 motor roller
16 roller
18 rack
20 axle
22 identification code
24 mobile device
26 central processor
28 configuration port
30 memory

The invention claimed is:

1. A motor-driven conveyor-roller controller for conveyor installations for conveying containers comprising,
a power inlet,
a wired I/O port, and
a wired motor roller port, wherein:
the controller is configured to
output motor roller control signals for a motor roller at the motor roller port
receive motor roller status signals from the motor roller at the motor roller port and
receive motor roller control signals for the motor roller at the I/O port,
wherein:
the wired I/O port is configured to exchange control information with a central control center;
the controller further comprises a wireless configuration port that is configured to wirelessly receive, from a mobile device, at least configuration signals for the motor roller and/or send status signals representing motor roller status information.

2. The controller according to claim 1,
wherein:
the controller further comprises a memory configured to log data including data representing motor roller status information, and
the wireless configuration port is further configured to wirelessly send the log data.

3. The controller according to claim 1,
wherein:
the wireless configuration port has a unique communication identification.

4. The controller according to claim 3,
wherein:
on a casing of the controller a code representing the unique communication identification is printed, in particular that the code is a barcode or a 2D code.

5. The controller according to claim 3,
wherein:
the wireless configuration port is configured to be paired with a mobile device using the unique communication identification.

6. The controller according to claim 3,
wherein:
the wireless configuration port is configured to be polled, such that upon polling the wireless configuration port wirelessly sends the unique communication identification.

7. The controller according to claim 1,
wherein:
the wireless configuration port is a radio communication port or the wireless configuration port is an optical communication port.

8. The controller according to claim 1,
wherein:
the wired motor roller port is configured for connection with one single motor roller only.

9. A system comprising the controller according to claim 1, and a mobile device, wherein the mobile device is configured to be paired with the controller and further configured to wirelessly send at least configuration signals for the motor roller to the wireless configuration port and/or receive status signals representing motor roller status information from the wireless configuration port.

10. The system according to claim 9,
wherein:
the mobile device is further configured to receive log data from the wireless configuration port.

11. The system according to claim 9,
wherein:
the mobile device is configured to be paired with the controller using the unique communication identification.

12. The system according to claim 9,
wherein:
the mobile device is configured to send the log data and/or the status information to a remote control center.

13. A method for operating a motor roller wherein the controller according to claim 1,
provides power to the motor roller and control the operation of the motor roller via the wired motor roller port,
receives motor roller control information via the I/O port from a central control center and sends motor roller status information via the I/O port to the central control center and
operates the motor roller according to the motor roller control information via the motor roller port
wherein:
the wireless configuration port wirelessly receives, from a mobile device, at least configuration signals for the motor roller and/or sends status signals representing motor roller status information.

14. A conveyor system for conveying containers, comprising:
a central control center;
a mobile device; and a motor-driven conveyor-roller controller including a power inlet, a wired I/O port, a wireless configuration port, and a wired motor roller port, and wherein the controller is configured to output motor roller control signals for a motor roller at the motor roller port, receive motor roller status signals from the motor roller at the motor roller port, and receive motor roller control signals for the motor roller at the wired I/O port, and wherein the wired I/O port is configured to exchange control information with the central control center, and wherein the wireless configuration port is configured to wirelessly receive, from the mobile device, at least configuration signals for the motor roller and/or send status signals representing motor roller status information.

15. The conveyor system according to claim 14, wherein:

the controller further comprises a memory configured to log data including data representing motor roller status information, and the wireless configuration port is further configured to wirelessly send the log data.

16. The conveyor system according to claim 14, wherein:

the wireless configuration port has a unique communication identification.

17. The conveyor system according to claim 16, wherein:

on a casing of the controller a code representing the unique communication identification is printed, in particular that the code is a barcode or a 2D code.

18. The conveyor system according to claim 16, wherein:

the wireless configuration port is configured to be paired with the mobile device using the unique communication identification.

19. The conveyor system according to claim 16, wherein:

the wireless configuration port is configured to be polled, such that upon polling the wireless configuration port wirelessly sends the unique communication identification.

20. The conveyor system according to claim 14, wherein:

the wireless configuration port is a radio communication port or the wireless configuration port is an optical communication port.

\* \* \* \* \*